United States Patent [19]
Brown et al.

[11] Patent Number: 5,909,154
[45] Date of Patent: Jun. 1, 1999

[54] BROADBAND SIGNAL TAP WITH CONTINUITY BRIDGE

[75] Inventors: James T. Brown, Flowery Branch; Dennis J. McLain, Duluth; Mark E. Adams, Grayson, all of Ga.

[73] Assignee: Antec Corporation, Duluth, Ga.

[21] Appl. No.: 08/867,036

[22] Filed: Jun. 2, 1997

[51] Int. Cl.⁶ .................................................. H03H 7/00
[52] U.S. Cl. ...................... 333/100; 200/51.1; 333/24 R; 333/136
[58] Field of Search ..................................... 333/100, 109, 333/124, 127, 136, 24 R; 200/51.1

[56] References Cited

U.S. PATENT DOCUMENTS

| | | |
|---|---|---|
| 3,641,464 | 2/1972 | Crowhurst et al. . |
| 3,671,885 | 6/1972 | Pennypacker . |
| 3,676,744 | 7/1972 | Pennypacker . |
| 3,747,028 | 7/1973 | Pennypacker . |
| 3,872,408 | 3/1975 | Reilly . |
| 3,881,160 | 4/1975 | Ross ......................................... 333/124 |
| 3,895,318 | 7/1975 | Ross ......................................... 333/136 |
| 4,755,776 | 7/1988 | Preschutti ................................. 333/100 |
| 5,058,198 | 10/1991 | Rocci et al. ......................... 333/100 X |
| 5,096,444 | 3/1992 | Lu et al. . |
| 5,179,334 | 1/1993 | Reddick . |
| 5,237,295 | 8/1993 | Reddick et al. . |
| 5,581,134 | 12/1996 | Romerein et al. ................... 333/100 X |
| 5,648,745 | 7/1997 | Spriester et al. ......................... 333/100 |
| 5,756,935 | 5/1998 | Balanovsky et al. .................... 333/100 |

Primary Examiner—Paul Gensler

[57] ABSTRACT

A continuity bridge in a broadband signal tap for providing a make-before-break connection of an input terminal to an output terminal of the tap. The broadband signal tap comprises a housing and a cover that is removably connected to the housing. The interior of the housing has an input terminal for receiving a signal from the feeder cable and an output terminal for returning the signal to the feeder cable. The cover includes circuitry for splitting the signal and delivering a portion thereof to at least one subscriber port on the cover. The cover has an input socket and an output socket, each being removably engaged with and electrically connected to the input and output terminals, respectively, of the housing. The continuity bridge in the housing connects the input terminal to the output terminal upon the removal of the cover from the housing prior to the disengagement of the sockets from the terminals. The continuity bridge thus provides a make-before-break connection of the input terminal to the output terminal, thereby ensuring that there is no discontinuity of signal flow through the tap upon the removal of the cover from the housing.

24 Claims, 10 Drawing Sheets

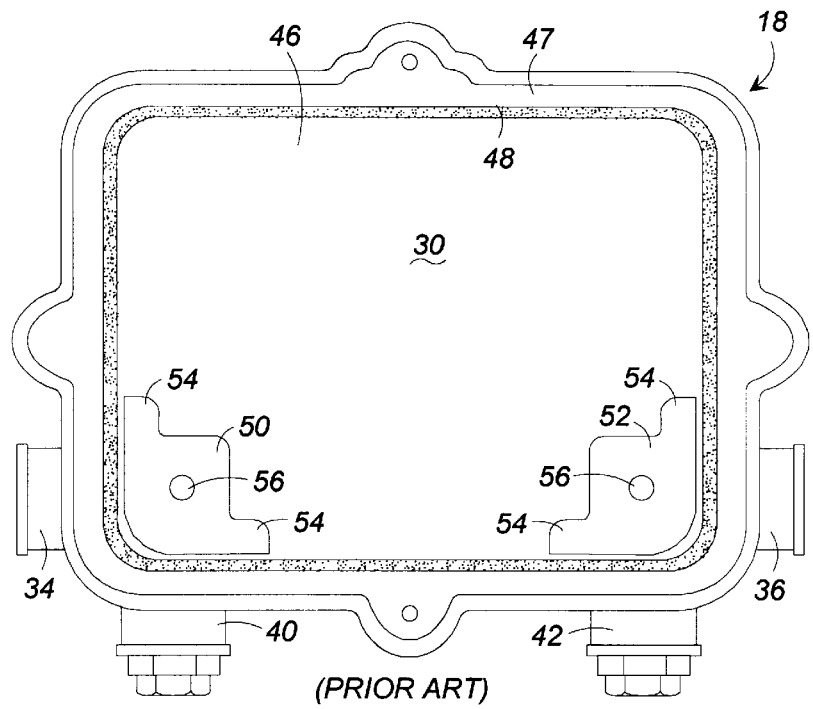
(PRIOR ART)
FIG. 4A
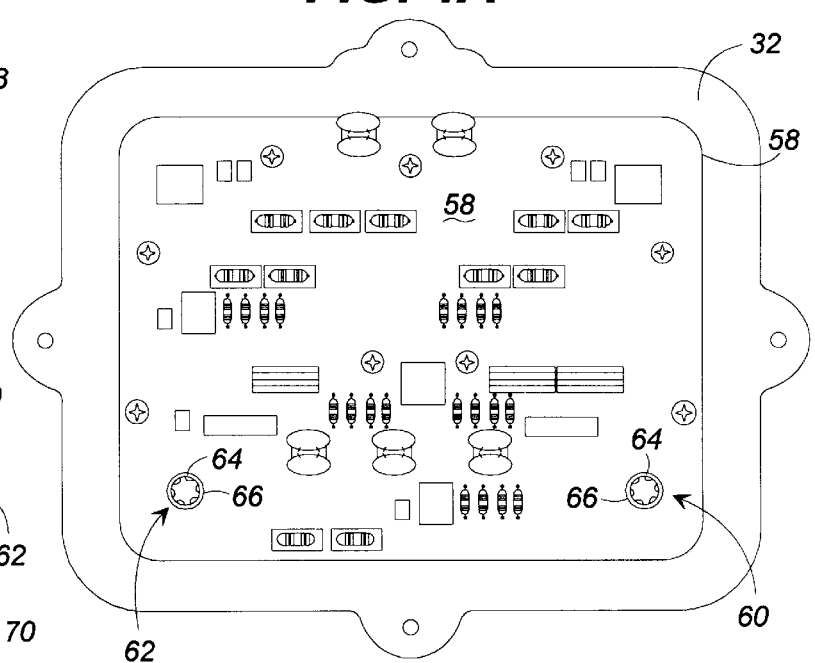
(PRIOR ART)
FIG. 4B
(PRIOR ART)
FIG. 4C
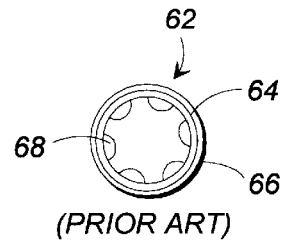
(PRIOR ART)
FIG. 4D

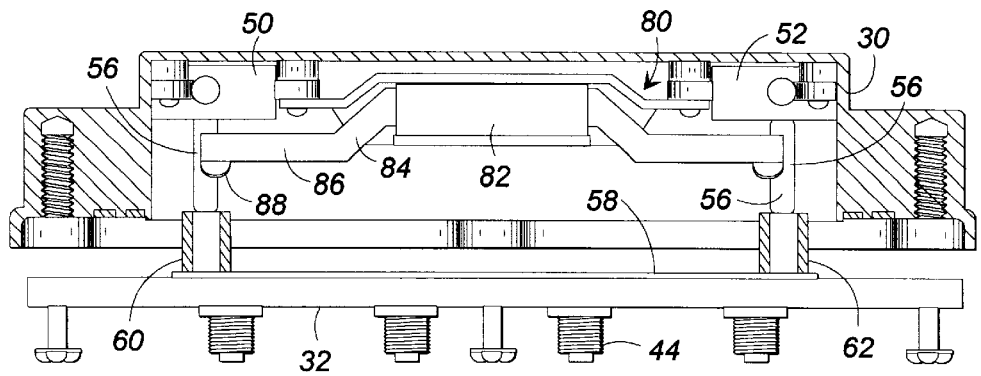
FIG. 8A
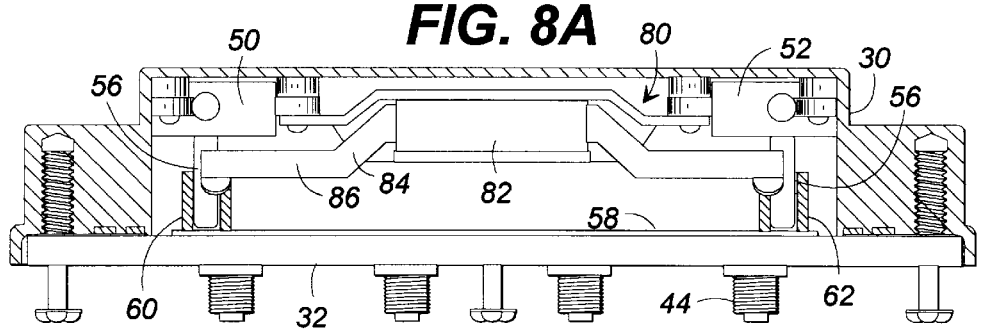
FIG. 8B
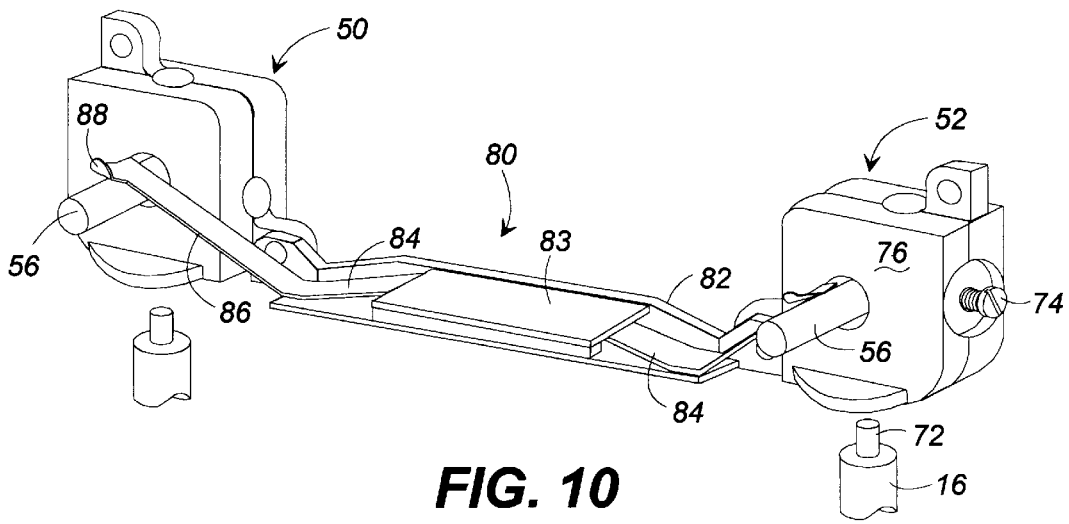
FIG. 10
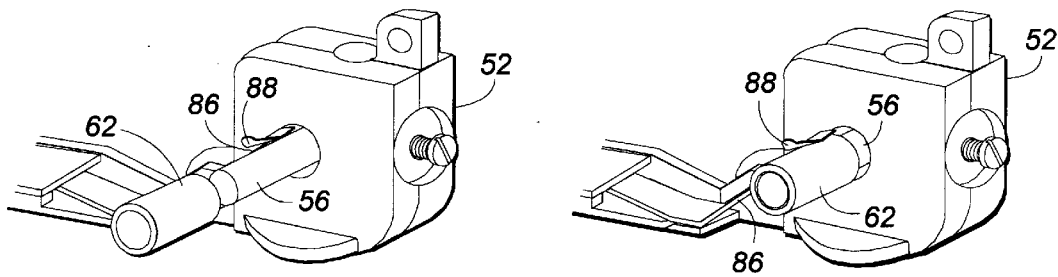
FIG. 11A     FIG. 11B

BROADBAND SIGNAL TAP WITH CONTINUITY BRIDGE

TECHNICAL FIELD

The present invention relates generally to apparatus for broadband network transmission as part of a cable television, cable telephone, or data distribution system, and more particularly to a broadband signal tap with a continuity bridge which allows uninterrupted broadband signal and power flow through the tap during insertion and removal of the faceplate of the tap.

BACKGROUND OF THE INVENTION

Typical cable television system networks, such as for cable TV or CATV, are normally comprised of four main elements, a head end, a trunk system, a distribution system consisting of coaxial feeder cables bridged from the trunk system, and subscriber drops fed from broadband signal taps coupled to the feeder cables in the distribution system.

The head end, the central originating point of all signals carried on the network, receives disparate signals from satellite, over the air broadcasts, or cable transmissions and combines and transmits these signals as a broadband signal (generally within a range of between 5 MHz and 1 Ghz) to numerous distribution nodes via trunk cables. Each distribution node, in turn, distributes the broadband signal along with power via the coaxial feeder cables, each feeder cable terminating at a termination block. Each feeder cable has numerous broadband signal taps coupled between the distribution node and the termination block. Each of these broadband signal taps draws a portion of the broadband signal and power (hereinafter, reference to signal means both signal, and the power supplied through the same cable) for use by a subscriber, typically a home or business, and transmits the remaining broadband signal to the next tap in the feeder. The portion of the broadband signal drawn (or tapped) from the main signal is transmitted via one or more drops to a like number of subscribers. Typically, there are hundreds, and sometimes thousands, of end users or subscribers connected to the coaxial feeder cables from one node.

In a subscriber's home, the drop can terminate directly into the television receiver on 12-channel systems, or into a converter where more than 12 channels are provided. Many newer cable-ready receivers and videocassette recorders have such a converter integrated into the tuner, with a switch to enable the additional channel tuning capability. Systems providing pay services may require a descrambler in the subscriber's home to allow the viewer to receive the special channels. Some systems use addressable converters or descramblers, giving the cable operator control over the channels received by subscribers with a computer. Such control enables impulse viewing or pay-per-view television service without a technician visiting the home to install the special service.

While the main purpose of cable television is to deliver a greater variety of high-quality television signals to subscribers, there is a growing interest in interactive communications, which allow subscribers to interact with the program source and to request various types of information, such as video text. An interactive system also can provide monitoring capability for special services such as home security. Additional equipment is required in the subscriber's home for such services. Monitoring requires a home terminal, for example, whereas information retrieval requires a video text decoder or modem for data transmission.

The broadband signal taps are coupled in series along each feeder cable, where the downstream side of a section of feeder cable is connected to an input terminal of the broadband signal tap and an output terminal of the tap is connected to the upstream side of the next section of feeder cable and so on. Within the broadband signal tap the broadband signal is split by a broadband signal transformer into a main signal and a much smaller tapped portion. The small portion of the broadband signal is delivered to the subscriber through a subscriber drop cable port, termed an "F-port", which connects to his drop. The remainder of the main broadband signal is returned to the coaxial feeder cable via the tap.

A conventional broadband signal tap comprises two assemblies: a housing and a cover or faceplate. The housing is for environmental protection of the tap electronics and further provides mechanical and electrical connection to the feeder cable. The tap housing attaches to the feeder cable with an input terminal and an output terminal. These terminals typically include electrical connectors for engagement with corresponding electrical connectors on the cover so that, when the cover is installed to the housing, the broadband signal and power delivered by the feeder cable is then routed through the cover. The faceplate contains electronics that apportions the broadband signal, sending a small portion of the signal to the subscriber and returning the main portion to the feeder cable through the output terminal.

An advantage of prior art broadband signal taps is that they allow for the removal and reinstallation of the tap cover and its corresponding electronics, without the need to remove and reinstall the entire broadband signal tap; that is, without the need to mechanically disconnect the tap housing from the feeder cable. These prior art broadband taps allow for the changing of the covers to provide for a different number of F-ports for more subscribers per tap, to upgrade the tap electronics and to provide replacement electronics for taps which become nonoperational.

However, networks such as described above having the broadband signal taps coupled in series along the feeder cables have some shortcomings. Namely, if one of the broadband signal taps goes out of service, e.g., by having its cover removed, the subscribers downstream of that broadband signal tap can be deprived of service. Such an interruption can occur as a result of lightning, mechanical or electrical failure, or even if a service technician removes the cover from its housing in one of the broadband signal taps. Removing the cover breaks the signal and power electrical continuity between the housing input terminal and its output terminal. This problem is aggravated if telephone service is provided over the same cable network. Interruptions to telephone service being much less tolerable than interruptions to television service.

More than just an inconvenience, service interruptions, even if for just a few milliseconds, can have serious consequences for the transmission of digital data over cable systems. Unlike analog signals, the loss of even a short portion of a digital data transmission can render the transmission unintelligible, or cause a failure of the signals to reach their intended destination. This probability increases directly with the bit rate and for high speed data transmissions even a short interruption is not acceptable.

Moreover, many of the newer services, including data and telephony services are being delivered by network interface units (NIUs) which are powered from the subscriber drop and thus from the tap. These NIUs include power supplies which provide for small variations in the power supplied over the drop but can not regulate for the loss of power caused by the removal of a cover of one of the taps in its network connection. A loss of power to a NIU could result in the loss of data downloaded to the device or other service interruptions.

Therefore, with the advent of pay-per view and interactive television, and the increased use of cable systems for telephone voice and data transmission, it has become much more important to provide a broadband signal tap which maintains continuity of service to the subscribers. In addressing this problem, it should also be borne in mind the substantial existing infrastructure of broadband signal taps which are currently in use along feeder cables.

Accordingly, there is an increasing need for a broadband signal tap with a means for maintaining the continuity of the broadband signal and the power over the feeder cable when the tap cover is removed from its housing.

It would be additionally advantageous to provide such a means for maintaining the continuity of the broadband signal and the power when the tap cover is removed from its housing which is easily retrofitable into existing broadband signal taps.

SUMMARY OF THE INVENTION

Briefly described, one preferred embodiment of the present invention comprises a broadband signal tap for use with a broadband network communication system carrying both a broadband signal and power. Preferably, the communication system has one or more distribution nodes, at least one coaxial feeder cable connected to a distribution node and a plurality of serially connected broadband signal taps along the feeder cable.

The broadband signal tap comprises a housing, a removable cover and a continuity bridge. The housing includes an environmental enclosure and an input terminal for receiving a broadband signal and power from the feeder cable and an output terminal for returning the signal and power to the feeder cable. The cover which mounts to the housing includes at least one subscriber output port and electronic means for tapping the broadband signal and for delivering a portion thereof to the subscriber output port. The electronic means also have an input connector and an output connector to couple and decouple to corresponding connectors of the input and output terminals as the cover is attached to or removed from the housing, respectively. When the cover is mounted to the housing the electronic means are protected by the environmental enclosure and route the broadband signal and power from the input terminal to the output terminal less any tapped portion. The continuity bridge is coupled between the input terminal and output terminal for maintaining the electrical continuity of the broadband signal and power between the two terminals while the cover is removed from the housing and for breaking the electrical continuity between the two terminals while the cover is mounted on the housing.

Preferably, the continuity bridge maintains signal and power continuity not only while the cover is removed but also during portions of the cover removal and insertion process. This advantageously produces a short duration electrically parallel connection where the continuity means and the electronic means of the cover are both attempting to rout the broadband signal and the power between the input terminal and the output terminal of the housing. Because the continuity bridge is essentially a conductor and much less reactive (resistively, inductively and capacitively) to signal and power flow than the electronic means, the signal and power will be routed through the continuity bridge during these common times. Operationally, the input and output connectors of the cover are electrically coupled to the input and output terminals of the housing before the continuity means breaks its path during the cover insertion process and the continuity bridge is engaged prior to the input and output connectors of the cover being electrically decoupled during the cover removal process. Thus, there is an electrical transfer of the signal and power between the continuity means and the electronic means rather than a mechanical switching (break or make) which could cause service interruptions and spikes in the signal output and power.

In one preferred implementation, the cover mechanically disengages the continuity bridge such that, when the cover is attached to the housing, the broadband signal tap operates in the conventional manner. Conversely, removal of the cover mechanically engages the continuity bridge causing the signal and power to pass directly through the bridge from the input terminal to the output terminal thereby maintaining signal and power to subscribers downstream from the broadband signal tap.

During the removal process, this implementation of the continuity bridge operates in a make-before-break fashion. The continuity bridge is mechanically engaged and electrically connects the input and output terminals before the cover is electrically removed from the housing. During the installation process, this implementation of the continuity bridge operates in a break-after-make fashion. The continuity bridge is mechanically disengaged and electrically disconnects the input and output terminals only after the cover is electrically coupled to the input and output terminals during insertion. Thus, in the process of removing or attaching the cover, there is no signal or power interruption to the subscribers downstream from the tap; nor is there any mechanical switching spike that could cause electrical noise in the broadband signal or power regulation problems.

In one preferred embodiment, the input terminal connector and output terminal connectors of the housing include conductive posts. The input connector and output connector of the cover comprise conductive sockets for mechanical engagement over the posts and electrical coupling thereto. The conductive sockets preferably have outer insulating shells that cooperate with the continuity bridge to selectively operate the bridge means. In one implementation, the continuity bridge comprises an elongated conductive strip, the ends of which are mechanically biased to engage against the sides of the posts and electrically couple them together. In another implementation, the ends of the continuity bridge are mechanically biased to engage against the ends of the posts.

In a second embodiment, the present invention comprises an improvement to an existing broadband signal tap. The improvement comprises a make-before-break and a break-after-make continuity bridge for coupling a broadband signal and power from the input terminal to the output terminal of the tap housing upon the removal of a tap cover from its housing and for decoupling the broadband signal and power from the input terminal and output terminal of a tap housing upon installation of its cover to the housing, respectively. Preferably, the continuity bridge is adapted to be installed within an existing broadband signal tap housing without removing the housing from its installation to a feeder cable. This allows the bridge to be added to existing broadband signal taps in the field, without need to disassemble or replace the broadband signal tap. Instead, with the present invention all that is necessary to upgrade such a broadband signal tap is to remove its cover and to install the bridge between the input terminal and the output terminal of the housing.

The present invention provides continuous service for downstream subscribers, even when a tap cover is removed from its housing. In the prior art broadband signal taps, removing the cover normally interrupted service for downstream users. The present invention is an elegant solution to a problem that has existed in the art. Furthermore, a retrofit can be economically and expeditiously achieved by first retrofitting those broadband signal taps that have the largest number of subscribers downstream from the broadband signal tap.

The present invention is simple, rugged, highly reliable and inexpensive. Though one embodiment is a mechanical switch, it does not cause electrical noise typically associated with mechanical switches. The tooling costs and productions costs are low, and the retrofit to existing prior-art broadband signal taps is simple, fast and inexpensive.

Unlike manually activated continuity bridges, the present invention maintains broadband signal continuity, thus preventing not only the annoyance of interruptions in analog signal service, but also the potential failures that can be caused by interruptions in telephony and digital data transmission.

Accordingly, it is a primary object of the present invention to provide a broadband signal tap that maintains broadband signal and power continuity in a feeder cable when the cover of one or more broadband signal taps of the feeder is removed.

It is another object of the present invention to provide means for upgrading existing broadband signal taps in the field to allow such broadband signal taps to maintain broadband signal and power continuity in their feeder cable even when the cover of one or more of the broadband signal taps is removed.

It is still another object of the present invention to provide a broadband signal tap that is economical, durable, and rugged.

These and other objects, features, and advantages of the present invention will become apparent upon reading the following specification in conjunction with the accompanying drawing figures.

BRIEF DESCRIPTION OF THE DRAWING FIGURES

FIG. 4A is a front view of a housing of the broadband signal tap illustrated in FIG. 3 with the cover removed;

FIG. 4B is an end view of a cover and electronic means of the broadband signal tap illustrated in FIG. 3;

FIG. 4C is rear view of a cover and electronic means of the broadband signal tap illustrated in FIG. 3;

FIG. 4D is an enlarged fragmented view of an input or output connector of the electronic means illustrated in FIG. 4B;

FIG. 8A is a cross-sectional side view of the housing illustrated in FIG. 7 taken along section lines 8A—8A of FIG. 7 and a cross-sectional side view of the cover illustrated in FIGS. 4B and 4C which are illustrated in the process of being assembled together before operation of the continuity bridge;

FIG. 8B is a cross-sectional side view of the of the housing illustrated in FIG. 7 taken along section lines 8A—8A of FIG. 7 and a cross-sectional side view the cover illustrated in FIGS. 4B and 4C which are illustrated as assembled together after operation of the continuity bridge;

FIG. 10 is an enlarged fragmented perspective view of the input and output terminals of the tap housing illustrated in FIG. 7 showing the mounting of the continuity bridge and the mechanical biasing of the continuity bridge contacts against the posts of the terminals;

FIG. 11A is an enlarged fragmented perspective view of the output terminal post, the tap cover connector and the continuity bridge contact illustrating the cooperation among them during the time period illustrated in FIG. 9C;

FIG. 11B is an enlarged fragmented perspective view of the output terminal post, the tap cover connector and the continuity bridge contact illustrating the cooperation among them during the time period illustrated in FIG. 9A;

Figure 15:
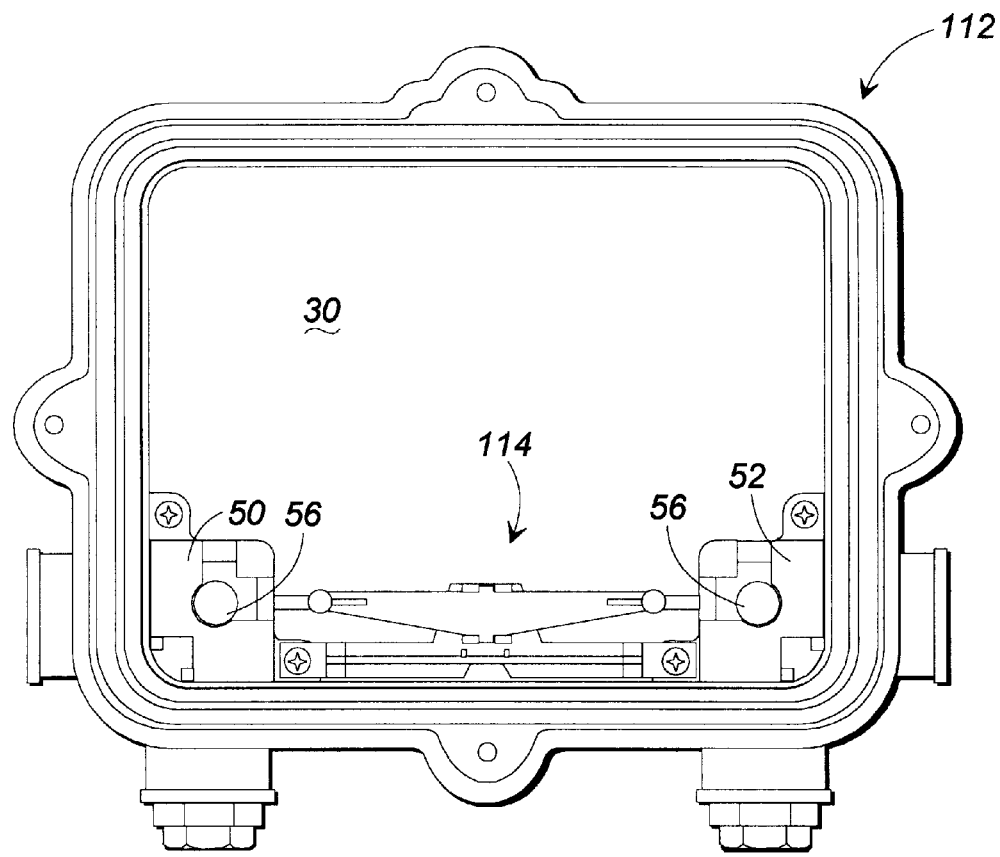
FIG. 15 is a front view of a housing of the broadband signal tap illustrated in FIG. 3 including a second embodiment of a continuity bridge constructed in accordance with the invention.
Figure 17:
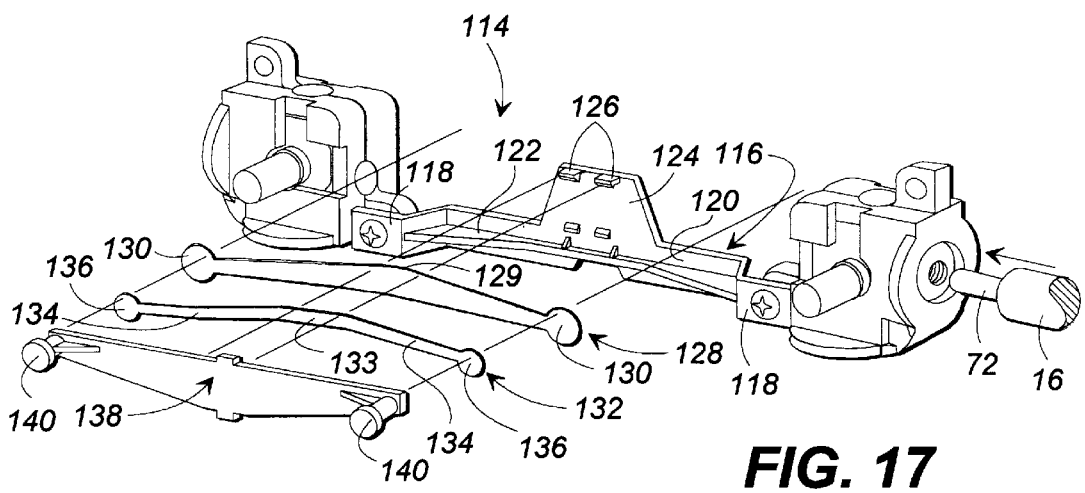
Figure 18:
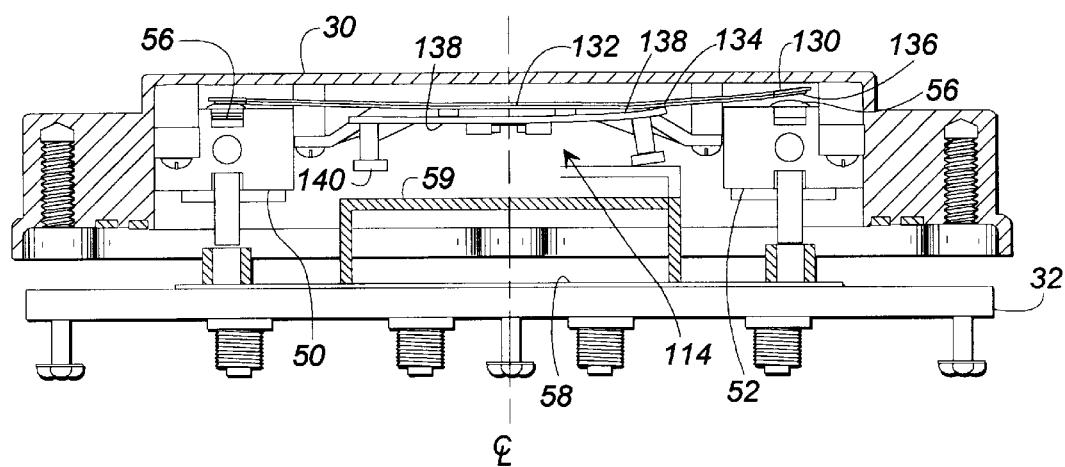

FIG. 17 is an enlarged fragmented, partially exploded, perspective view of the input and output terminals of the tap housing illustrated in FIG. 15 illustrating the part assembly of the second embodiment of the continuity bridge; and FIG. 18 is a cross-sectional side view of the of the housing illustrated in FIG. 15 and a cross-sectional side view the cover illustrated in FIGS. 4B and 4C which illustrate the times before and after operation of the second embodiment of the continuity bridge.

DETAILED DESCRIPTION OF THE PREFERRED EMBODIMENTS

Referring now in detail to the drawing figures, wherein like reference numerals represent like parts throughout the several views, FIG. I shows the network operating elements of a typical communication or CATV system 10. A head end 12 is the originating point for a broadband signal carried downstream to a multiplicity of subscribers. Signal sources input to the headend 12 include off-the-air stations, satellite services, and terrestrial microwave relays. Programming can also originate at the head end 12. All of the source signals are processed and then combined by the headend 12 into a broadband signal for broadcast transmission over the distribution network.

The head end 12 feeds the broadband signal through one or more trunk cables 13. Each trunk cable 13 comprises main coaxial cable segments separated by trunk amplifiers 11 and bridger amplifiers 14. The trunk amplifiers 11 prevent degradation of the broadband signal along the trunk cable 13 and the bridger amplifiers 14 form distribution nodes which in turn distribute the broadband signal through one or more coaxial feeder cables 16. The feeder cables 16 distribute the broadband signal to a plurality of subscribers 19. What has been described is a CATV network with a conventional tree and branch architecture. It is also conventional that the distribution points 14 can be optical nodes fed with a broadband signal from optical fibers in a star configuration, also termed a hybrid fiber/coax (HF/C) network Normally, for a tree and branch network power can be inserted on the coaxial cable, either the trunk or the feeder cable, at different points and can be used to power the active network elements or subscriber equipment such as a network interface device (NIU) 21. Power is usually inserted at the distribution points 14 or nodes for HF/C networks. In either event, it is well known that the feeder cable 16 carries not only the broadband signal but also network power.

Each feeder cable 16 terminates at termination block 17 and includes a number of broadband signal taps 18 and a lesser number of line extender amplifiers 20. The taps 18 and amplifiers 20 are serially interposed along sections of the feeder cable 16 between a distribution node 14 and a termination block 17. Each broadband signal tap 18 draws a small portion of the broadband signal transmitted through feeder cable 16 and delivers it to one or more of the subscribers 19, such as a home or business. Typically, there are hundreds and sometimes thousands of subscribers supported by each of the distribution nodes 14. The broadband signal taps 18 are connected to the subscriber equipment 19, possibly the NIU, using a coaxial subscriber drop cable 15.

In the past, removing or disassembling one of the broadband signal taps 18 for maintenance, upgrade or any other purpose interrupted service to the remaining subscribers downstream of that broadband signal tap on its feeder cable 16. While this is a serious problem for the cable TV services, it is even more serious if the cable system carries telephone or data communications. Subscribers and governmental regulatory agencies are less forgiving for interruptions to telephone service, compared to interruptions to cable television service. Data services as they become faster are not able to be interrupted for even short periods of time without a significant degradation of service. Further, if power is interrupted on a feeder cable 16 for more than a short time, NIU 21 can have difficulty holding the regulation of its power supply or can lose downloaded data.

Figure 1:
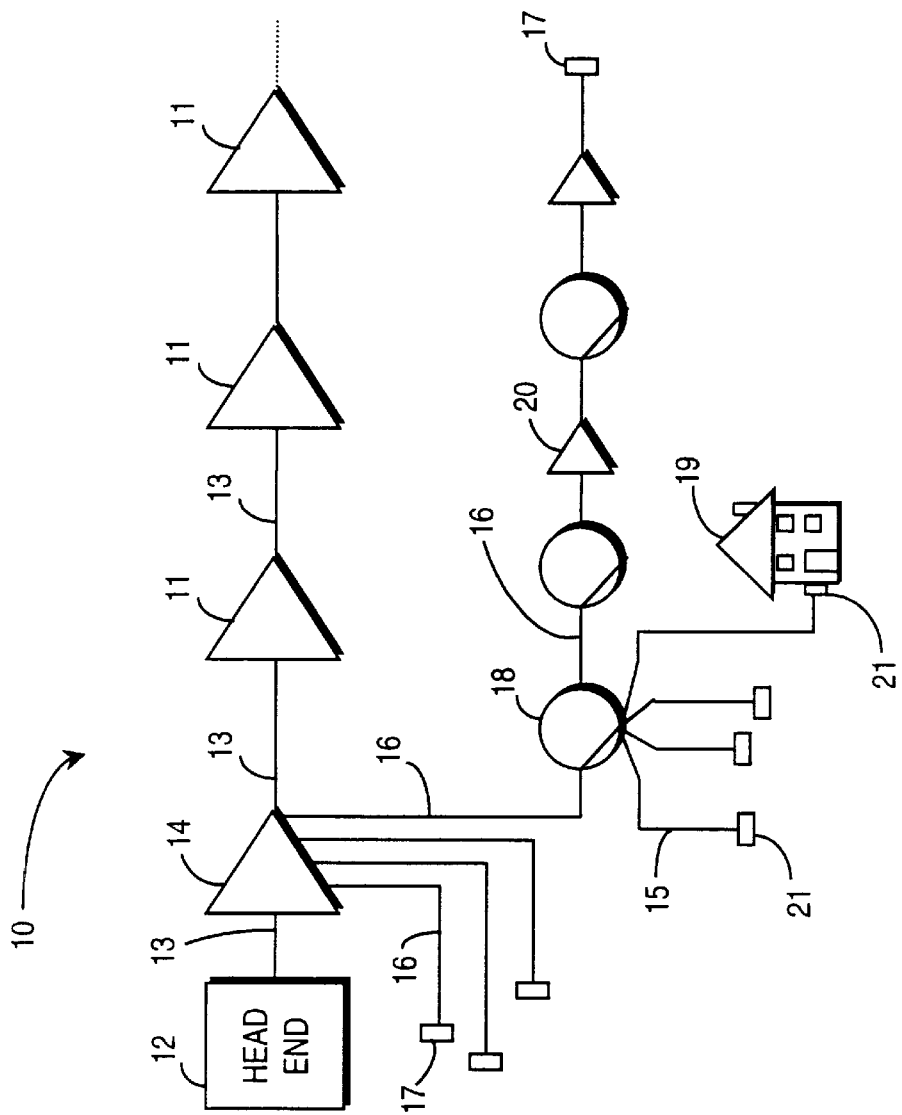
FIG. 1 is an electrical schematic system block diagram of the network elements for a broadband communication or CATV system.
Figure 2:
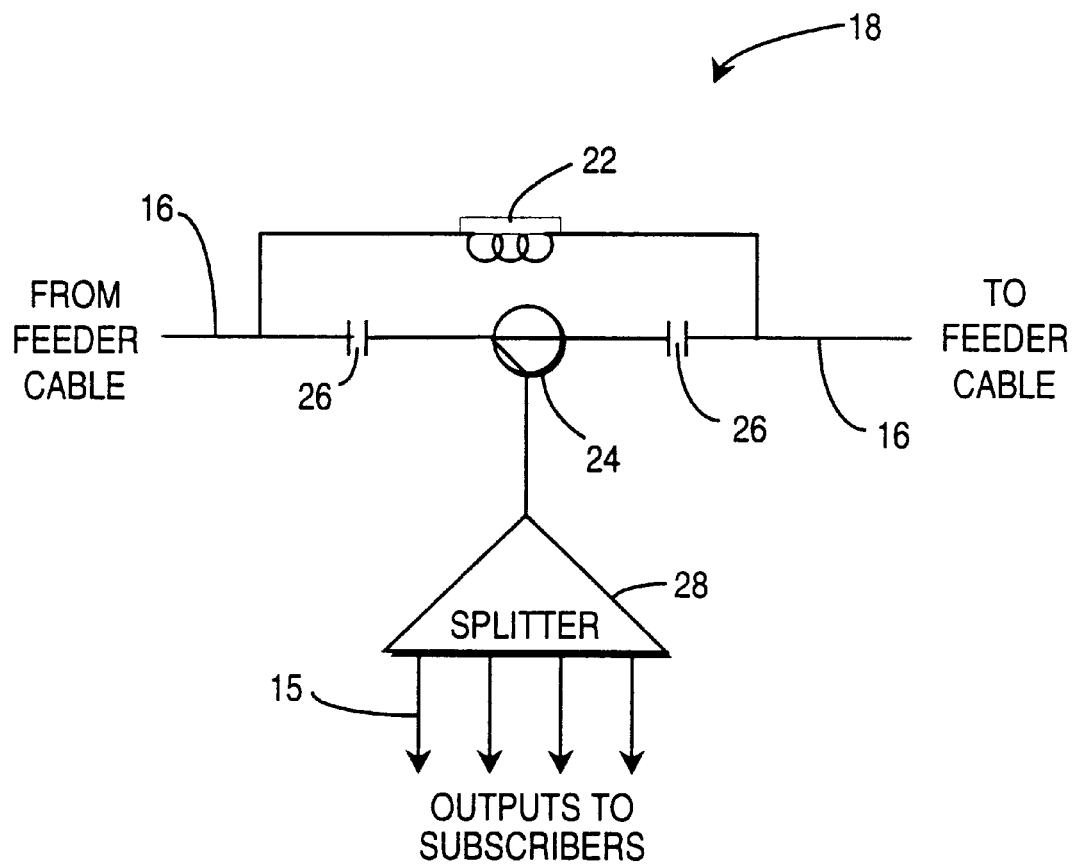
FIG. 2 is an electrical schematic diagram of the electronic means of a conventional broadband signal tap commonly used in the type of system illustrated in FIG. 1.
Figure 3:
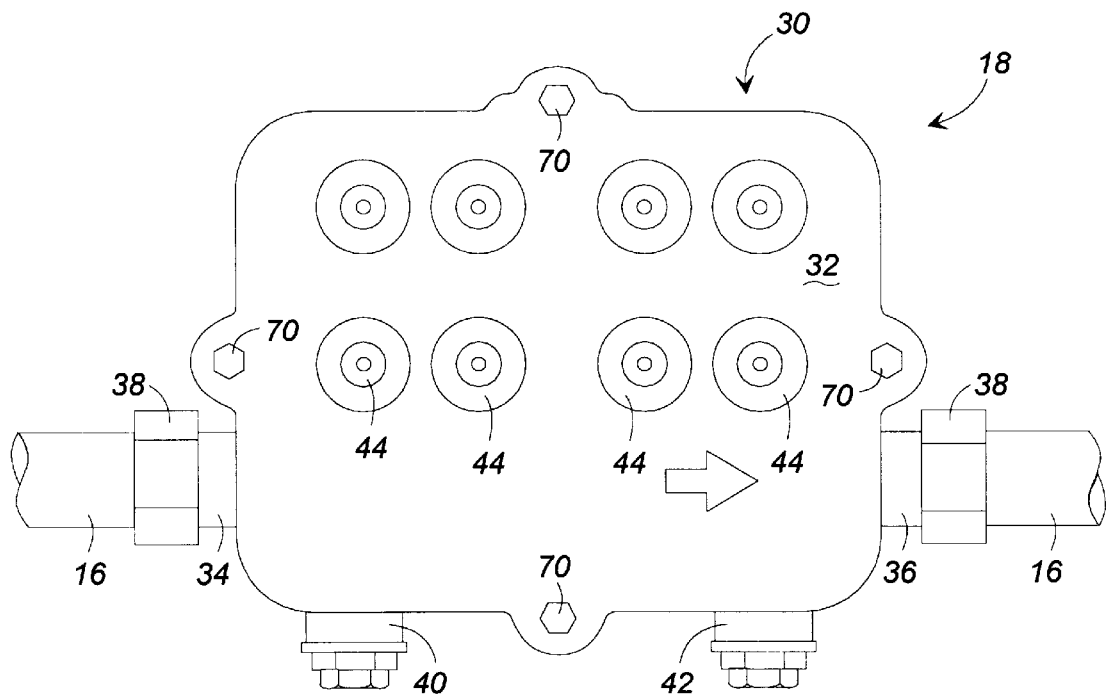
FIG. 3 is a front view of a conventional broadband signal tap as typically mounted in the type of system illustrated in FIG. 1.

FIG. 2 is an electrical schematic diagram of the circuitry or electronic means of a conventional broadband signal tap 18 commonly used in the type of cable system illustrated in FIG. 1. The broadband signal tap 18 normally comprises a power bypass choke 22, a directional coupler 24, power blocking capacitors 26 and a possibly a splitter 28. Splitter 28 provides for subscriber drop connections to a plurality of subscribers, typically from two to eight subscribers. The directional coupler 24 removes an appropriate amount of energy from the broadband signal carried by feeder cable 16 and splitter 28 divides that signal into an appropriate number of signal paths for distribution to the subscribers 19. The blocking capacitors 26 and the bypass choke 22 block power from, and bypass it around, respectively, the directional coupler 24 thereby separating the power flow from the broadband signal flow. Other conventional broadband signal taps 18 may also include a means for tapping a portion of the power flowing on feeder cable 16 and delivering it to the subscriber 19, such as for the purpose of powering the NIU 21 through the subscriber drop 15.

Referring to FIGS. 3, and 4A–4D, a physical implementation of the tap 18 is shown. The broadband signal tap 18 depicted is of a type manufactured and marketed by Antec Corporation, Rolling Meadows, Ill., the assignee of the present invention, under the brandname and trademark REGAL®, model RMT. Conventionally, the broadband signal tap 18 comprises a housing 30 containing the electronic means and a cover 32 bolted to the housing. Cover 32 is suitably secured to the housing 30 using threaded fasteners 70.

The housing 30 is generally a rectangular half shell having four sides and a bottom defining an environmentally protected chamber for mounting and protecting the electronic means therein. One side of the housing 30 has a threaded feeder cable connector input port 34, and a similar output port 36 is positioned opposite thereto. The incoming section of the feeder cable 16 is connected to the input port 34 using a threaded cable connector 38. Similarly, the outgoing portion of the feeder cable 16 is connected to the output port 36 using another threaded cable connector 38. The general mounting of the broadband signal tap 18 in the network is aerially on utility poles supported on a steel wire, also know as a strand, which also serves to mount and support the feeder cable 16. Additional ports 40 and 42 are provided as alternative input and output ports for the feeder cable 16; for example, if the broadband signal tap 18 is mounted on a pedestal.

The tap cover 32 includes a plurality of environmentally sealed F-connector ports 44. These F-connector ports couple the broadband signal from the tap 18 to the subscriber drops 15, such as for connection to televisions, VCRs and cable converter boxes. While the broadband signal tap 18 depicted in FIGS. 3 and 4A–4D includes four such F-connector ports, those skilled in the art will recognize that fewer or greater numbers of ports can be provided as necessary. Turning now to FIG. 4A, the housing 30 is shown without the cover or faceplate 32 thereby revealing an open interior 46. The outer periphery of housing 30 has a groove that holds an environmental O-ring seal 47. The broadband signal tap 18 also has an electromagnetic interference (EMI) prevention gasket 48 to reduce the penetration of electromagnetic energy through the crevice formed at the interface between cover 32 and housing 30.

Figure 5:
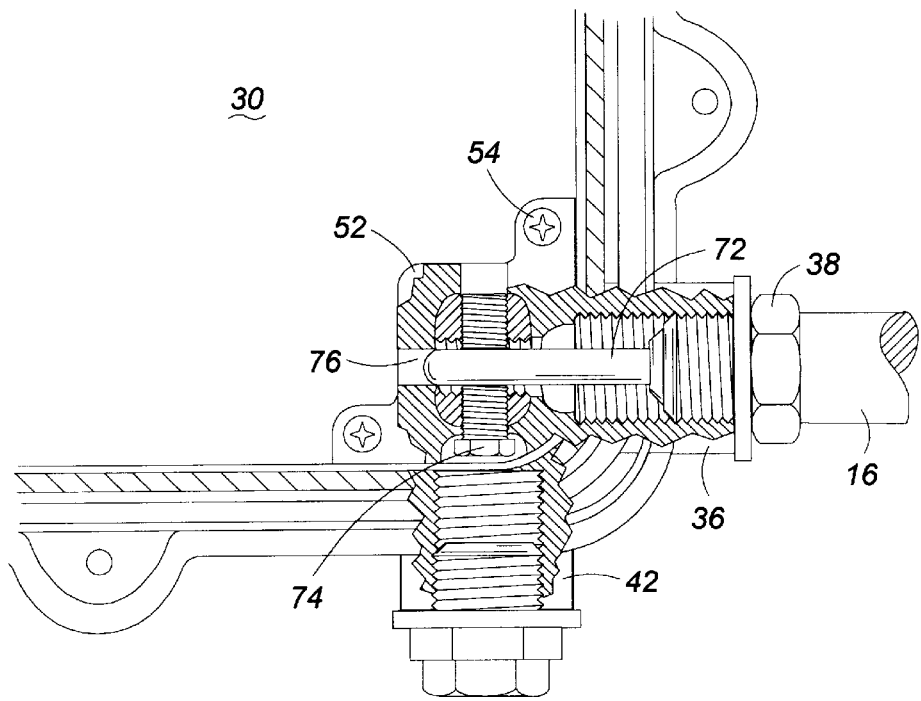
FIG. 5 is a partially fragmented cross-sectional view of one of the input or output terminals of the housing illustrated in FIG. 4A showing how the feeder cable attaches to the terminal.

Mounted within the interior 46 of housing 30 are a pair of terminal assemblies 50 and 52. Terminal assembly 50 receives the broadband signal from feeder cable 16 and then delivers it to the electronic means attached to cover 32. Terminal assembly 52 receives the return broadband signal from the electronic means and cover 32 and returns the signal to the feeder cable 16. Terminal assemblies 50 and 52 are secured to the housing 30 using threaded fasteners 54. In this manner, the terminal assemblies 50 and 52 have conductive terminals or posts 56 electrically coupled to the feeder cable 16. As better seen in FIG. 5, there is shown a cross sectional view of the terminal assembly 52 of the broadband signal tap 18 of FIG. 4A illustrating the mechanical and electrical attachment of the feeder cable 16 to the terminal assembly 52. The center conductor 72, sometimes termed a stinger pin, of feeder cable 16 extends into and penetrates a threaded cavity 76 of terminal assembly 52. A cross drilled post extension (not shown) having the post 56 extending from either side fills the center cavity of the insulative body of the terminal assembly 52. A retaining screw 74 is screwed against and compresses center conductor 72 against the post extension thereby retaining the conductor 72 within the assembly and making electrical contact between the post 56 and feeder cable 16. The terminal assembly 52 is a conventional component which is commercially available.

Returning to FIG. 4B, a side view of cover 32 is shown. Cover 32 includes two peripheral tongues that engage the O-ring and EMI seals 47 and 48 of the housing 30. A printed circuit board 58 is mounted to the inside face of cover 32. The circuit board 58 includes circuitry or electronic means that is illustrated in FIG. 2 and is electrically coupled to deliver the broadband signal to the F-ports 44 on the front of the cover 32. Those skilled in the art are familiar with the variations in circuitry that can be used to accomplish this function in a broadband signal tap.

Referring now to both FIG. 4B and FIG. 4C, the printed circuit board 58 includes an input connector 60, preferably in the shape of a socket, and an output connector 62 of similar structure. As better viewed in the enlargement of FIG. 4D, sockets 60 and 62 each comprise conducting inner sleeves 64 preferably covered with insulating outer shells 66, approximately 0.060 inches thick. Inner metal socket 64 also includes a number of spring plates 68, which help secure a post 56 of a terminal assembly within each socket. In addition, the spring plates 68 allow a greater dimensional tolerance between the post 56 and the socket 60, and reduce the insertion friction while maintaining good electrical contact between terminal and socket, despite variations in size, thermal expansion, vibration etc.

Figure 6:
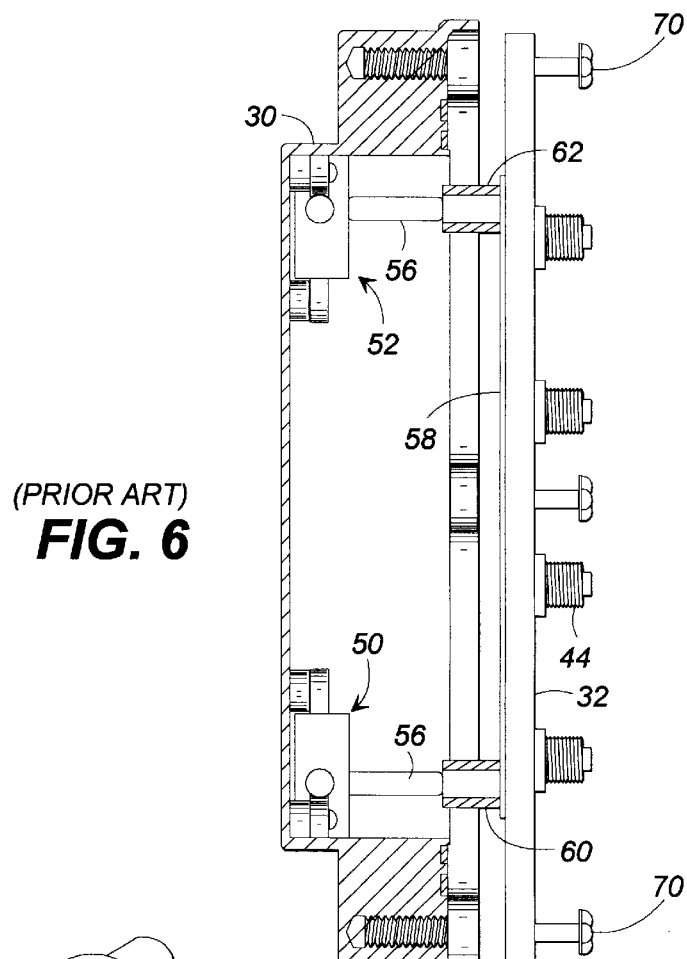
FIG. 6 is a cross-sectional side view of the broadband signal tap illustrated in FIG. 3, showing the mounting of the cover onto the housing.

FIG. 6 illustrates the assembly of the cover 32 onto the housing 30 where the connectors 60 and 62 receive the posts 56 to make electrical contact for the cover. Removal of the cover 32 disconnects the electronic means on the cover from the terminal posts 56 and the broadband signal. However, removal of the cover 32 also breaks the continuity of the coaxial cable 16 as there is a physical gap between the posts 56 in the housing 30. This creates a loss of the broadband signal for all subscribers in the feeder cable downstream of the housing 30. The invention solves this problem by providing a continuity bridge between the posts 56 to maintain the broadband signal to the downstream subscribers. Further the continuity bridge is provided in such a manner that the continuity of the broadband signal to the downstream subscribers is not disturbed even when the cover 32 is removed from the housing 30.

Figure 7:
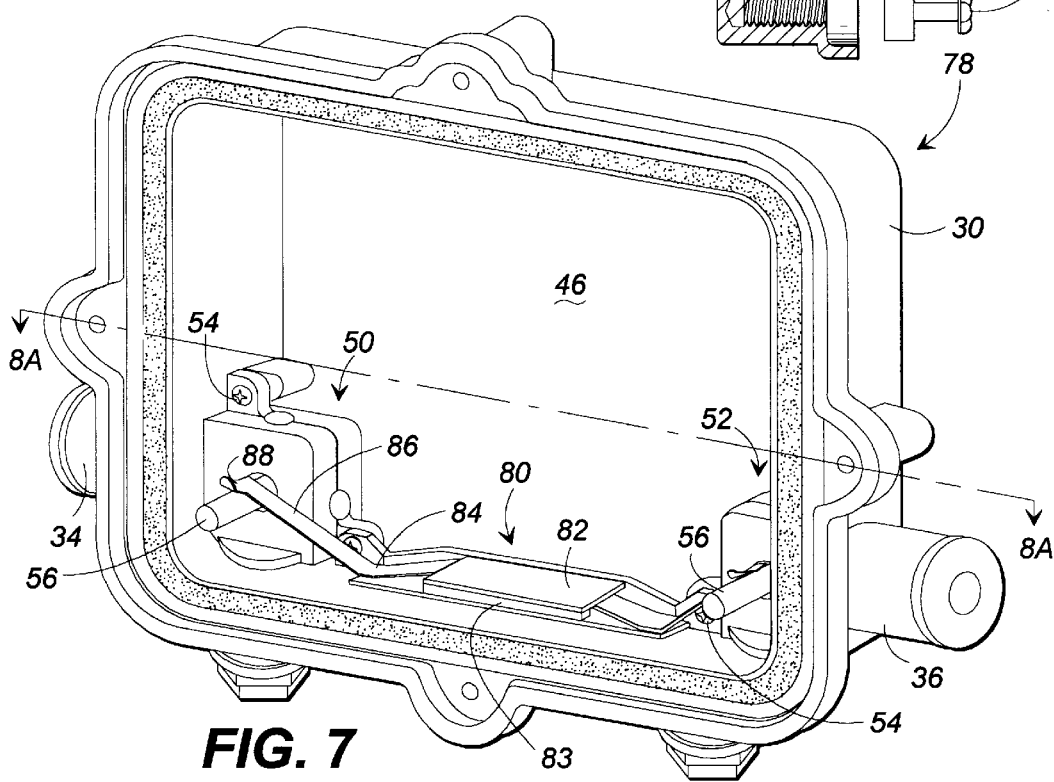
FIG. 7 is a front perspective view of a housing of the broadband signal tap illustrated in FIG. 3 including a first embodiment of a continuity bridge constructed in accordance with the invention.

FIG. 7 shows a first preferred embodiment of the invention and depicts a broadband signal tap housing 30 including a continuity bridge 80 constructed in accordance with the invention. The housing 30 shares many common features with the structure depicted in FIGS. 3–6 described above. In the following discussion, like numerals are used for the common elements between the two structures. The housing 30 comprises a molding including the four walls and a floor, the feeder cable input port 34, the feeder cable output port 36, and the input and output terminal assemblies 50 and 52 which are secured with fasteners 54 to the housing. The continuity bridge 80 spans the distance between the conductive posts 56 and provides electrical continuity from the input terminal assembly 50 to the output terminal assembly 52. The continuity bridge 80 includes a central shelf 82 of insulating material, preferably moldable plastic, and an elongate electrically conductive strip 84. Preferably, the insulating shelf 82 is secured to the housing 30 of the broadband signal tap 18 using the same fasteners 54 which secure the terminal assemblies 50 and 52 to the housing. When the continuity bridge 80 is installed on units already deployed in the field, existing fasteners are removed and replaced with longer fasteners. The shelf 82 also constrains a central cover 83 over the electrically conductive spring strip 84 to fix it in one position. End portions 86 of electrically conductive spring strip 82 engage against terminal posts 56. The end portions 86 of the electrically conductive spring strip 84 also have tab portions 88 which are bent upwardly away from the metal posts. The upwardly bent tab portions ease the input and output terminal sockets 60 and 62 past the electrically conductive spring strip end portions 86 during assembly of the cover 32 to the housing 30, as described below. To its advantage, the subject invention can be incorporated in the current design of broadband signal taps 18, either by adding the bridge 80 during the fabrication of new taps, or by retrofitting taps in the field.

As shown in FIG. 7, the end portions 86 of the electrically conductive spring strip 82 are positioned on one side and biased against terminal posts 56. In a second implementation of this preferred embodiment (further discussed below), the end portions 86 of the electrically conductive spring strip 82 can be positioned on the other side and biased against the terminal posts 56, thereby placing the end portions 86 between terminal posts 56 and the outer periphery of the housing 30. The advantage of this implementation is that when cover 32 is installed, end portions 86 are pushed away from terminal posts 56 by the insulating outer shell 66, thereby moving end portions 86 toward housing 30 and away from the electronic circuitry of the printed circuit board 58.

FIGS. 8A and 8B show the tap cover 32 is in the process of being assembled to housing 30 and operating the continuity bridge 80. It can be seen that the input and output terminal sockets 60 and 62 of cover 32 initially engage and make contact with terminal posts 56 of input and output terminals assemblies 50 and 52. Thus, upon initial assembly, before full penetration of posts 56 inside sockets 60 and 62, the feeder cable 16 is electrically coupled to the cover 32. Referring specifically to FIG. 8B, complete engagement of cover 32 onto housing 30 displaces and disengages tabs 86 of the electrically conductive spring strip 84 from the terminal posts 56 opening the continuity bridge contacts. As discussed in greater detail below, this action results in a making of the broadband signal tap terminals before breaking the bridge contacts 80 with the terminal posts 56.

Figure 9A:
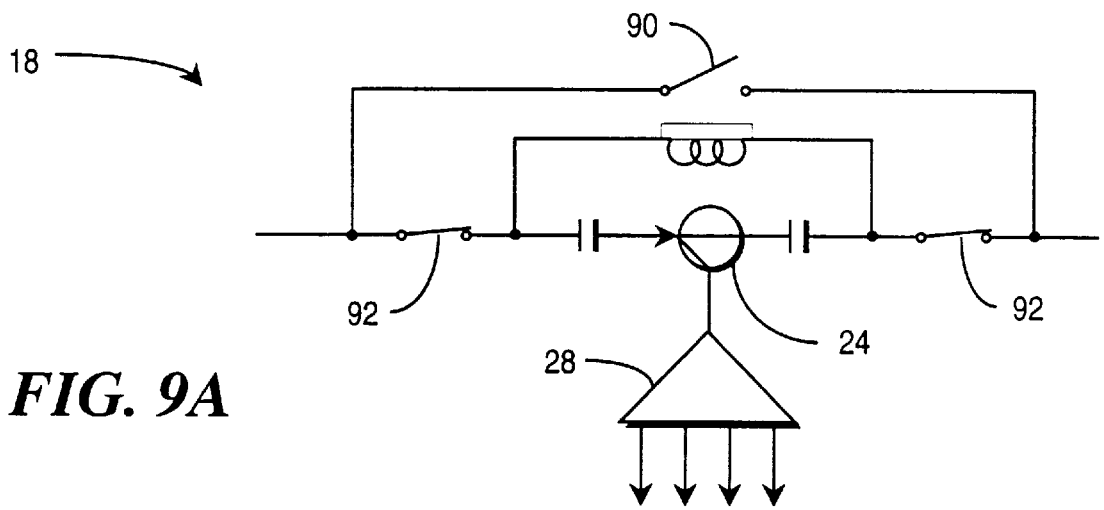
FIGS. 9A–9C are schematic views of the operation of the broadband signal tap contacts in conjunction with the continuity bridge contacts for a fully assembled condition, a partially assembled condition, and a fully disassembled condition, respectively.
Figure 9B:
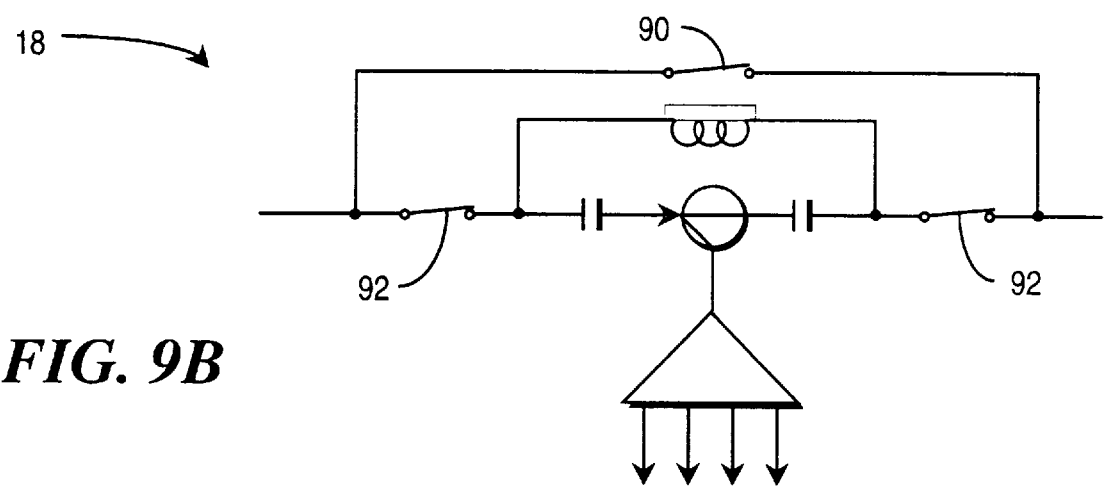
Figure 9C:
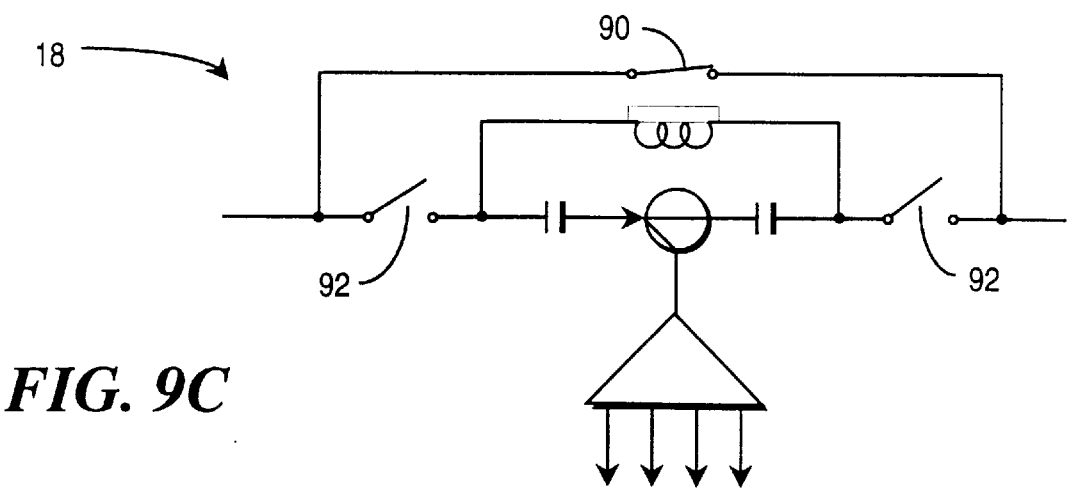

FIGS. 9A–9C are schematic diagrams of the broadband signal tap 18, illustrating the electrical engagement and disengagement of the continuity bridge contacts 90 and the broadband signal tap contacts 92, that is, the contact between terminal posts 56 with input and output terminal sockets 60 and 62. The figures illustrate the make-before-break functionality of the continuity bridge of the subject invention. Although this functionality is discussed in terms of continuity bridge 80, the same discussion applies to all other embodiments of the subject invention discussed below. Bridge contacts 90 represent the electrical contact and connection between end portions 86 of the electrically conductive spring strip 84 with terminal posts 56 of input and output terminals 50 and 52. Tap contacts 92 represent the electrical contact and connection between input and output terminal sockets 60 and 62 with the terminal posts 56.

Turning now to FIGS. 8B, 9A and 11B these figures show the condition of bridge contacts 90 and tap contacts 92, when cover 32 is fully installed to housing 30. When cover 32 is fully assembled onto housing 30, the insulating outer shell 66 of the input and output terminal sockets 60 and 62 displace the end portions 86 of the electrically conductive spring strip 84, preventing electrical continuity between the end portions 86 with the terminal posts 56 of input and output terminals 50 and 52. Thus, at this stage, bridge contacts 90 are open and tap contacts 92 are closed.

Referring now to FIGS. 8A and 9B, it shows the condition of bridge contact 90 and tap contacts 92, when cover 32 is partially removed from, or partially installed to, the housing 30. When cover 32 is partially removed from housing 30, the insulating outer shell 66 of the input and output terminal sockets 60 and 62 move away from the end portions 86 of the electrically conductive spring strip 84. The spring tension of the electrically conductive spring strip 84 causes the end portions 86 to move towards and touch, thus making electrical contact with, terminal posts 56 of input and output terminals 50 and 52. At this stage, both bridge contacts 90 and tap contacts 92 are closed. The reverse process also holds true where upon installation of cover 32 to housing 30, the continuity bridge contacts 90 are engaged with the input and output terminal posts 56 before the sockets 60 and 62 make contact with terminal posts 56.

Referring now to FIGS. 7, 9C and 11A, they show the condition of bridge contacts 90 and tap contacts 92, when cover 32 is fully removed from housing 30. When cover 32 is fully removed from housing 30, the input and output terminal sockets 60 and 62 move away from terminal posts 56 of input and output terminals 50 and 52, thus no longer making electrical contact. However, at this stage, the bridge contacts 90 are already closed, thereby maintaining broadband signal continuity across the broadband signal tap.

FIG. 10 is an illustration of the bridge 80 in the broadband signal tap 18, shown with end portions 86 of the electrically conductive spring strip 82 making contact against terminal posts 56. FIG. 10 also shows the input and output feeder cables 16, with the center conductor 72 about to be inserted into the input and output terminal assemblies 50 and 52. Upon insertion of the center conductor 72, retaining screw 74 is tightened to make electrical contact with center conductor 72 of feeder cable 16. The bent portions of the electrically conductive spring strip 84 enable the spring strip to reach over the terminal assemblies to make contact with terminal posts 56. FIGS. 10, 11A and 11B show that as cover 32 slides onto housing 30, the insulating outer shell 66 of the input and output terminal sockets 60 and 62 engage the tab portions 88 of the electrically conductive spring strip 84, helping the end portions 86 to raise up and over the insulating outer shell 66 thereby electrically disconnecting bridge 80 from the input and output terminal assemblies 50 and 52.

Figure 12:
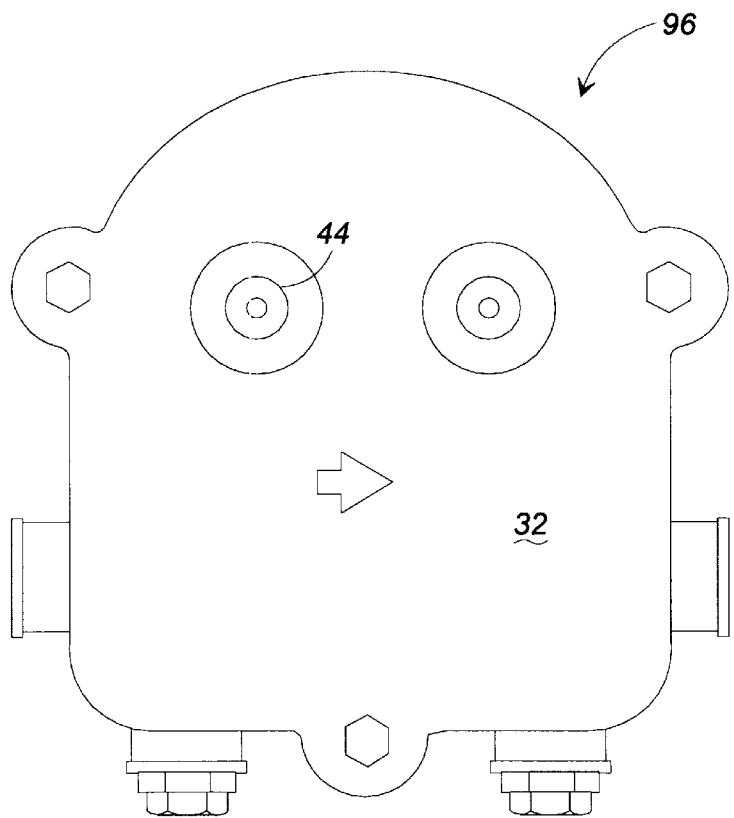
FIG. 12 is a front view of another type of broadband signal tap commonly used in the cable system of FIG. 1.
Figure 13:
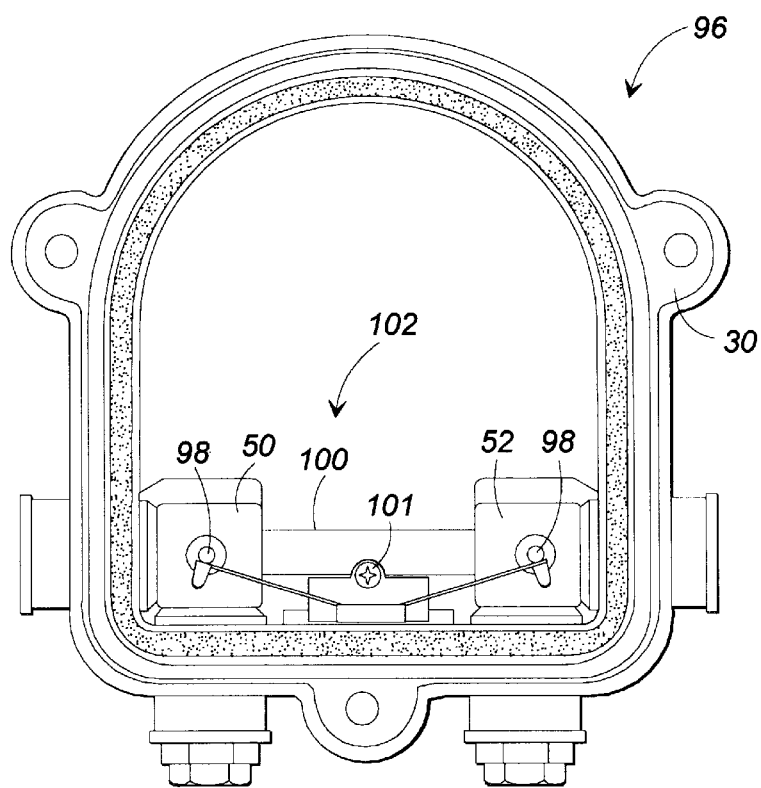
FIG. 13 is a front view of the housing of the broadband signal tap illustrated in FIG. 12 including a second implementation of the preferred embodiment of the continuity bridge.

For illustrative purposes, FIGS. 12 and 13 show a broadband signal tap 96 with a different overall shape than previously discussed, showing that the broadband signal tap housing can be made in various configurations. In this case broadband signal tap 96 is smaller than the ones discussed above, cover 32 having only two F connector ports 44. FIG. 13 also shows another implementation of the first embodiment discussed above. In this implementation, the broadband signal tap 96 has a modified continuity bridge 102. Broadband signal tap 96 shares many common features with the prior broadband signal tap 18 depicted in FIGS. 3–8 described above. In the following discussion, like numerals are used for the common elements between the broadband signal taps.

FIG. 13 illustrates the broadband signal tap 96 including a housing 30 without its cover 32. An input terminal assembly 50 and output terminal assembly 52 are positioned within the interior of housing 30. Terminal assemblies 50 and 52 each include a smaller diameter terminal post 98. Terminal posts 98 have tapered distal ends to ease the cover 32 and its corresponding input and output terminal sockets 60 and 62, over terminal posts 98. Terminal assemblies 50 and 52 are interconnected for support by a terminal linking element 100, and are secured within and to the housing using a single fastener 101. The continuity bridge 102 is installed within and secured to housing 30 using the same fastener 101 that secures terminal assemblies 50 and 52.

Figure 14:
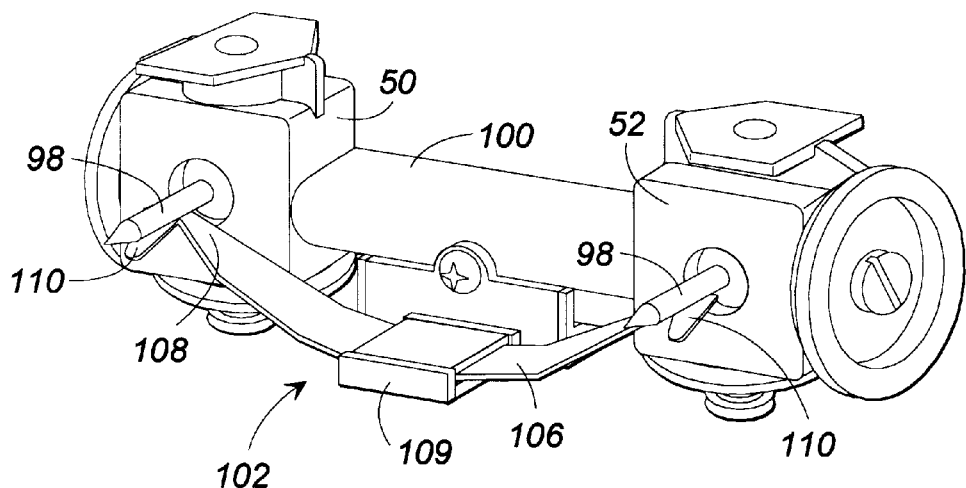
FIG. 14 is a perspective view of the continuity bridge of the broadband signal tap of FIG. 13, showing the continuity bridge making contact with the broadband signal tap terminals.

Referring now to FIGS. 13 and 14, continuity bridge 102 includes an insulating housing 109 containing a central portion of electrically conductive spring strip 106, which spans from terminal post 98 of the input terminal assembly 50 to terminal post 98 of the output terminal assembly 52. The continuity bridge 102 is configured such that the ends 108 of the electrically conductive spring strip 106 are positioned between the each terminal post 98 and the outer peripheral edge of the housing 30. With this arrangement, as the cover 32 (not shown) is attached onto the housing 30, the input and output terminal sockets 60 and 62 (not shown) on the printed circuit board 58 (not shown) push the end portions 108 of the electrically conductive spring strip 106 away from the terminal posts 98, toward the side wall of the housing 30, and away from the electronics of the printed circuit board 58 (not shown). The end portions 108 of the electrically conductive spring strip 106 has tab portions 110 that help ease the ends portions 108 of the electrically conductive spring strip 106 over the outer periphery of the insulating outer shell 66 (not shown) of the input and output terminal sockets 60 and 62 (not shown).

As discussed above, in reference to the first embodiment, the assembly of continuity bridge 102 onto the housing 30 provides for a make-before-break contact of the broadband signal tap terminals before breaking the continuity bridge 102 contacts with the terminal posts 98. The reverse process also hold, that is, upon removal of cover 32 from housing 30, the continuity bridge 102 contacts engage with the input ant output terminal posts 56, before the cover 22 input and output terminal sockets 60 and 62 break contact with terminal posts 56.

FIG. 15 shows a second preferred embodiment of a broadband signal tap according to the present invention. In this embodiment broadband signal tap 112 includes a continuity bridge 114 of a different implementation than that shown and described above. In this embodiment continuity bridge 114 makes contact against the ends of the terminal posts 56, rather than against the side surfaces of said posts. Specifically, continuity bridge 114 makes contact behind the post between the back side of the terminal assemblies 50 and 52 and the inside surface of the housing 30.

Figure 16:
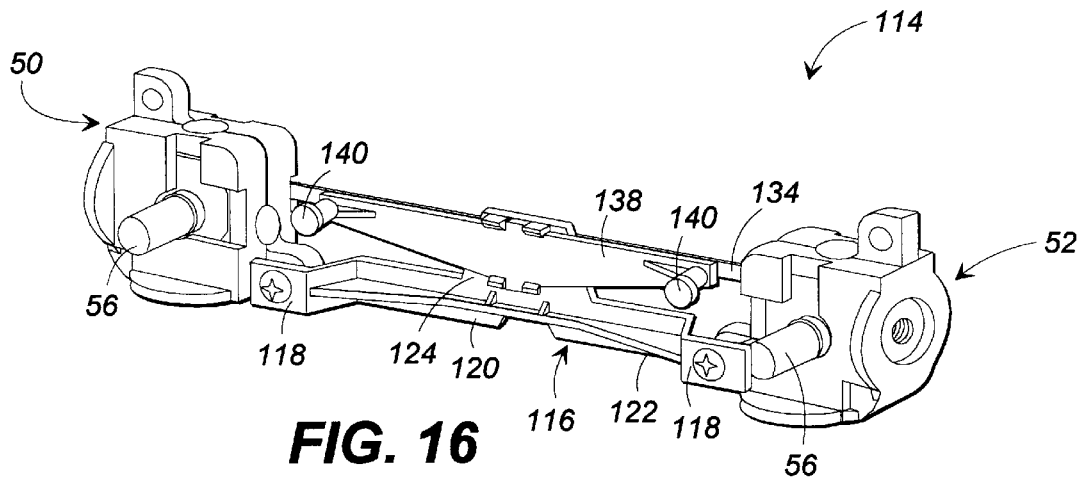
FIG. 16 is a an enlarged fragmented perspective view of the input and output terminals of the tap housing illustrated in FIG. 15 illustrating the mounting of the second embodiment of the continuity bridge and the mechanical biasing of the continuity bridge contacts against the ends of the posts of the terminals.

As shown in FIGS. 16 and 17, bridge 114 consists of four basic components which are assembled and snapped together. Bridge 114 includes a molded insulating base 116 which has two mounting flanges 118 for receiving screws and fastening to the housing 30 (shown in FIG. 15) with input and output terminal assemblies 50 and 52. The molded insulating base 116 includes an intermediate portion 120 extending from one flange to the other. A reinforcing element 122 stiffens the base. The molded insulating base also includes an upstanding portion 124 bearing four retaining clips 126. The bridge 114 also includes a flexible flat insulator strip 128 which has an overall appearance of a barbell. The insulating strip 128 includes a central portion 129 which is received against the upstanding portion 124 of the molded insulating base 116. Large diameter insulator pads 130 are provided at the ends of the insulator strip 128. The bridge 114 also includes a unitary elongated electrically conductive spring strip 132 placed against the insulating strip 128. Electrically conductive spring strip 132 has a center flat portion 133 and two longer portions 134 that extend outwardly from the central portion 129 at an angle thereto. Electrically conductive spring strip 132 terminates at contact pads or terminals 136. Next, an insulating deflector bar 138 is positioned over electrically conductive spring strip 132 and is held in place by the four retaining clips 126. The insulating deflector bar 138 has upstanding pads or buttons 140.

Now referring to FIG. 18, there is shown a tap 18 with the continuity bridge 114 mounted therein. The cover 32 is shown in a disassembled state with a deflector plate 59 mounted thereon. When the cover 32 is in the disassembled state, or in a partially assembled state, the spring strip 132 pushes contacts 136 into electrical contact with the backside of posts 56 as shown in the left half of FIG. 18. When cover 32 is filly attached to housing 30, the deflector plate 59 presses against buttons 140 thereby pushing them rearwardly and disengaging contact pads 136 of electrically conductive spring strip 132 from the back of terminal posts 56 as shown in phantom and the right half of FIG. 18. Upon deflection of insulating deflector bar 138, the large diameter insulator pads 130 of insulating strip 128 prevent electrically conductive spring strip 132 and its contact pads 136, from touching and shorting out against the back wall of housing 30.

As discussed above, the assembly of continuity bridge 114 onto the housing provides for a make-before-break contact of the broadband signal tap terminals before breaking the continuity bridge 114 contacts with the terminal posts 56. The reverse process also holds, that is, upon removal of cover 32 from housing 30, the continuity bridge 114 contacts engage with the input ant output terminal posts 56, before the cover 22 input and output terminal sockets 60 and 62 break contact with terminal posts 56.

The broadband signal taps according to the present invention are effective and useful in allowing servicing of the broadband signal tap without interruption of service to downstream subscribers. The continuity bridges of the first embodiment, can be retrofitted to many existing broadband signal taps in the field simply by removing the cover, removing one or more screws from the housing of the broadband signal tap, inserting the continuity bridge between the terminal posts and replacing the removed screws with longer screws.

While the invention has been disclosed in several of its preferred forms, it will be apparent to those skilled in the art that many other modifications, additions, and deletions can be made thereto without departing from the spirit and scope of the invention as set forth in the following claims.

We claim:

1. A broadband signal tap for use with a communication system which broadcasts and distributes a broadband signal to a plurality of subscribers, said broadband signal tap comprising:

a housing having at least one wall and a bottom which define an interior enclosure, said housing further comprising an input port for receiving the broadband signal from the system and an output port for returning the signal to the system, said input port being electrically connected to an input terminal assembly within said interior enclosure, and said output port being electrically connected to an output terminal assembly within said interior enclosure;

a cover adapted to be removable from and installable to said housing for covering and uncovering said interior enclosure to provide an environmentally protected enclosure, said cover including an input terminal socket and an output terminal socket, each said input and output terminal sockets adapted to correspondingly engage with and disengage from said input terminal assembly and said output terminal assembly as said cover is installed to and removed from said housing, said cover having at least one external subscriber port and an electronic means located on an internal side of said cover and protected by said enclosure for receiving the broadband signal and tapping a portion thereof for delivery to said subscriber port when said input and output terminal sockets are engaged with said input and output terminal assemblies; and a continuity bridge for electrically coupling said input port to said output port upon the removal of said cover from said housing and for decoupling said input port from said output port upon the installation of said cover to said housing;

wherein said input and output terminal assemblies each include an elongate electrically conductive post, each said post having an end and sides;

said continuity bridge includes electrically conductive contacts biased to engage against said sides of said posts for making electrical contact to the posts and a bridge conductor electrically coupled to the contacts for bridging between said posts and for electrically coupling the posts together when said contacts are engaged to said posts; and said input and output terminal sockets each include an insulating shell having an electrically conductive inner sleeve and an electrically insulative outer sleeve, said insulating shell for engaging said electrically conductive contacts as said cover is attached to said housing and for disengaging from said electrically conductive contacts as said cover is removed from said housing.

2. The broadband signal tap of claim 1 wherein each said electrically conductive contact comprises a tab for contacting said post, wherein each said tab includes a portion that contacts said post and a portion that is bent away from said post for engaging each respective terminal socket when each said socket is engaged with each said post.

3. The broadband signal tap of claim 2 wherein, upon engagement of each said socket with each said post when said cover is attached to said housing, each said socket displaces each said tab away from said electronic means.

4. The broadband signal tap of claim 2 wherein said continuity bridge comprises a unitary, elongate electrically conductive strip spanning from said input terminal assembly to said output terminal assembly.

5. The broadband signal tap of claim 1 wherein said continuity bridge comprises electrically conductive contacts biased to engage against said input and output terminal assemblies, wherein each said electrically conductive contact comprises one or more tabs for electrically connecting said electrically conductive contacts with said input and output terminal assemblies, and wherein each said tab includes a portion that contacts said post and a portion that is bent away from said post for engaging each respective terminal socket when each said socket is engaged with each said post.

6. The broadband signal tap of claim 5 wherein, upon engagement of each said socket with each said post when said cover is attached to said housing, each said socket displaces each said tab away from said electronic means.

7. The broadband signal tap of claim 5 wherein said continuity bridge comprises a unitary, elongate electrically conductive strip spanning from said input terminal assembly to said output terminal assembly.

8. The broadband signal tap of claim 1 wherein said input and output terminal assemblies each are attached to said housing using at least one threaded fastener screwed into a threaded hole, and wherein said continuity bridge is attached to said housing using threaded fasteners screwed into said threaded holes.

9. A broadband signal tap for use with a communication system which broadcasts and distributes a broadband signal to a plurality of subscribers, said broadband signal tap comprising:
- a housing having at least one wall and a bottom which define an interior enclosure, said housing further comprising an input port for receiving the broadband signal from the system and an output port for returning the signal to the system, said input port being electrically connected to an input terminal assembly within said interior enclosure, and said output port being electrically connected to an output terminal assembly within said interior enclosure;
- a cover adapted to be removable from and installable to said housing for covering and uncovering said interior enclosure to provide an environmentally protected enclosure, said cover including an input terminal socket and an output terminal socket, each said input and output terminal sockets adapted to correspondingly engage with and disengage from said input terminal assembly and said output terminal assembly as said cover is installed to and removed from said housing, said cover having at least one external subscriber port and an electronic means located on an internal side of said cover and protected by said enclosure for receiving the broadband signal and tapping a portion thereof for delivery to said subscriber port when said input and output terminal sockets are engaged with said input and output terminal assemblies; and
- a continuity bridge for electrically coupling said input port to said output port upon the removal of said cover from said housing and for decoupling said input port from said output port upon the installation of said cover to said housing;
- wherein said input and output terminal assemblies each comprise an elongate electrically conductive post, each said post comprising an end and sides; and
- said continuity bridge includes electrically conductive contacts biased to engage against said end portions of said electrically conductive posts for making electrical contact between said posts.

10. The broadband signal tap of claim 9 wherein:
said continuity bridge further comprises an elongate member having two end portions and an intermediate portion there between, said elongate member spanning from said input terminal assembly to said output terminal assembly; and wherein said continuity bridge further comprises buttons between said end portions and said intermediate portion, said buttons being in contact with the ends of said elongate member, said buttons for pushing said electrically conductive contacts as said cover is attached onto said housing for disengaging said end portions of said elongate member from said ends of said posts.

11. The broadband signal tap of claim 10 wherein said continuity bridge comprises a unitary strip.

12. The broadband signal tap of claim 9 wherein said input and output terminal assemblies each are attached to said housing using at least one threaded fastener screwed into a threaded hole, and wherein said continuity bridge is attached to said housing using threaded fasteners screwed into said threaded holes.

13. A broadband signal tap having a housing with walls defining an opening and an interior, said housing further having an input port for receiving a signal from a feeder cable and an output port for returning the signal to the feeder cable, the tap further including a cover removably attached to the housing for covering and uncovering said opening, the cover having at least one subscriber port and electronic means mounted thereto for receiving the signal and delivering a portion thereof to the subscriber port, comprising:
- a continuity bridge for electrically coupling said input port to said output port upon the removal of the cover from the housing and for decoupling said input port from said output port via said bridge upon the installation of the cover to the housing;
- wherein said housing further comprises an input terminal assembly electrically connected to said input port, and an output terminal assembly electrically connected to said output port;
- wherein said cover further comprises an input terminal socket and an output terminal socket adapted to correspondingly engage with and disengage from said input terminal assembly and said output terminal assembly, respectively, as said cover is attached to and removed from said housing; and
- wherein said continuity bridge is engaged and operated by said input terminal socket and said output terminal socket;
- wherein said input and output terminal assemblies each comprise an elongate electrically conductive post, each said post comprising an end and sides, and wherein said continuity bridge comprises electrically conductive contacts biased to engage against said sides of said posts for making electrical contact between said posts; and
- said input terminal socket and said output terminal socket each comprise an insulating shell having an electrically conducting inner sleeve and an electrically insulative outer sleeve, said insulative outer sleeve for engaging said electrically conductive contacts as said cover is attached to said housing and for disengaging from said electrically conductive contacts as said cover is removed from said housing.

14. The broadband signal tap of claim 13 wherein each said electrically conductive contact comprises a tab for contacting said post, wherein each said tab includes a portion that contacts said post and a portion that is bent away from said post for engaging the insulative outer sleeve of each respective terminal socket when each said socket is engaged with each said post.

15. The broadband signal tap of claim 14 wherein upon engagement of each said socket with each said post when said cover is attached to said housing, each said socket displaces each said tab away from said electronic means.

16. The broadband signal tap of claim 13 wherein said input and output terminal assemblies each are attached to said housing using at least one threaded fastener screwed into a threaded hole, and wherein said continuity bridge is attached to said housing using threaded fasteners screwed into said threaded holes.

17. A broadband signal tap having a housing with walls defining an opening and an interior, said housing further having an input port for receiving a signal from a feeder cable and an output port for returning the signal to the feeder cable, the tap further including a cover removably attached to the housing for covering and uncovering said opening, the cover having at least one subscriber port and electronic means mounted thereto for receiving the signal and delivering a portion thereof to the subscriber port, comprising:

a continuity bridge for electrically coupling said input port to said output port upon the removal of the cover from the housing and for decoupling said input port from said output port via said bridge upon the installation of the cover to the housing;

wherein said housing further comprises an input terminal assembly electrically connected to said input port, and an output terminal assembly electrically connected to said output port;

wherein said cover further comprises an input terminal socket and an output terminal socket adapted to correspondingly engage with and disengage from said input terminal assembly and said output terminal assembly, respectively, as said cover is attached to and removed from said housing; and wherein said continuity bridge is engaged and operated by said input terminal socket and said output terminal socket;

wherein said input and output terminal assemblies each comprise an elongate electrically conductive post, each said post comprising an end and sides, and wherein said continuity bridge comprises electrically conductive contacts biased to engage against said sides of said posts for making electrical contact between said posts;

wherein said continuity bridge includes electrically conductive contacts having a tab for contacting each said post, wherein each said tab includes a portion that contacts said post and a portion that is bent away from said post for engaging each respective terminal socket when each said socket is engaged with each said post; and wherein upon engagement of each said socket with each said post when said cover is attached to said housing, each said socket displaces each said tab away from said electronic means.

18. A broadband signal tap for use in a broadband signal distribution system, comprising:

a housing having an input terminal assembly and an output terminal assembly connected therein, said input and output terminal assemblies each including an electrically conductive post having an end and sides;

a cover removably connected to said housing, said cover having an input terminal socket and an output terminal socket connected thereto for removably engaging with the post of said input terminal assembly and the post of said output terminal assembly, respectively, said input and output terminal sockets each including an insulating shell having an electrically conductive inner sleeve and an electrically insulative outer sleeve; and a continuity bridge including electrically conductive contacts biased to engage against said sides of said posts for providing an electrical connection between said input terminal assembly and said output terminal assembly when said cover is removed from said housing, and for disconnecting the electrical connection between said input terminal assembly and said output terminal assembly when said cover is connected to said housing.

19. The broadband signal tap of claim 18 wherein each said electrically conductive contact includes a tab for contacting said post, wherein each said tab includes a portion that contacts said post and a portion that is bent away from said post.

20. The broadband signal tap of claim 18 wherein said input and output terminal assemblies each are attached to said housing using at least one threaded fastener screwed into a threaded hole, and wherein said continuity bridge is attached to said housing using threaded fasteners screwed into said threaded holes.

21. A broadband signal tap for use in a broadband signal distribution system, comprising:

a housing having an input terminal assembly and an output terminal assembly connected therein, said input and output terminal assemblies each including an electrically conductive post having an end and sides;

a cover removably connected to said housing, said cover having an input terminal socket and an output terminal socket connected thereto for removably engaging the post of said input terminal assembly and the post of said output terminal assembly, respectively; and a continuity bridge including electrically conductive contacts biased to engage against said sides of said posts for providing an electrical connection between said input terminal assembly and said output terminal assembly when said cover is removed from said housing, and for disconnecting the electrical connection between said input terminal assembly and said output terminal assembly when said cover is connected to said housing;

wherein each said electrically conductive contact includes a tab for contacting said post, wherein each said tab includes a portion that contacts said post and a portion that is bent away from said post for engaging each respective terminal socket when each said socket is engaged with each said post.

22. The broadband signal tap of claim 21 wherein said input and output terminal sockets each include an insulating shell having an electrically conductive inner sleeve and an electrically insulative outer sleeve, said insulating shell for engaging the bent away portion of each said tab as said cover is attached to said housing and for disengaging from the bent away portion of each said tab as said cover is removed from said housing.

23. A broadband signal tap for use in a broadband signal distribution system, comprising:

a housing having an input terminal assembly and an output terminal assembly connected therein, said input and output terminal assemblies each including an electrically conductive post having a first end and a second end;

a cover removably connected to said housing, said cover having an input terminal socket and an output terminal socket for removably connecting to the first end of the post of said input terminal assembly and to the first end of the post of said output terminal assembly, respectively; and a continuity bridge including electrically conductive contact pads biased to contact said second ends of said posts for establishing an electrical connection between said input terminal assembly and said output terminal assembly when said cover is removed from said housing, and for disconnecting the electrical connection between said input terminal assembly and said output terminal assembly when said cover is connected to said housing;

wherein said continuity bridge further comprises at least one button between said contact pads such that movement of said button causes corresponding movement of said contact pads;

wherein when said cover is connected to said housing, said cover pushes said button such that said contact pads are moved away from said second ends of said posts, thereby disconnecting the electrical connection between said input terminal assembly and said output terminal assembly; and wherein when said cover is disconnected from said housing, said cover releases said button such that said contact pads are moved into contact with said second ends of said posts, thereby establishing an electrical connection between said input terminal assembly and said output terminal assembly.

24. The broadband signal tap of claim 23 wherein said cover further includes a deflector plate for engaging said button when said cover is connected to said housing.

* * * * *